(12) United States Patent
Cordle

(10) Patent No.: US 10,236,108 B2
(45) Date of Patent: Mar. 19, 2019

(54) SOLENOID COIL DISCHARGING CIRCUIT

(71) Applicant: Target Rock Division of Curtiss-Wright Flow Control Corporation, East Farmingdale, NY (US)

(72) Inventor: Kevin Gerard Cordle, Miller Place, NY (US)

(73) Assignee: TARGET ROCK DIVISION OF CURTISS-WRIGHT FLOW CONTROL CORPORATION, East Farmingdale, NY (US)

( * ) Notice: Subject to any disclaimer, the term of this patent is extended or adjusted under 35 U.S.C. 154(b) by 296 days.

(21) Appl. No.: 15/238,183

(22) Filed: Aug. 16, 2016

(65) Prior Publication Data

US 2018/0053589 A1 Feb. 22, 2018

(51) Int. Cl.

| H01F 7/06 | (2006.01) |
|---|---|
| H01H 47/04 | (2006.01) |
| H01H 47/32 | (2006.01) |
| H02H 9/04 | (2006.01) |
| H01F 7/10 | (2006.01) |

(52) U.S. Cl.
CPC ........... *H01F 7/064* (2013.01); *H01H 47/043* (2013.01); *H01F 7/10* (2013.01); *H01H 47/325* (2013.01); *H02H 9/04* (2013.01); *H02H 9/047* (2013.01); *Y10T 307/766* (2015.04)

(58) Field of Classification Search
USPC ................................................ 361/139, 160
See application file for complete search history.

(56) References Cited

U.S. PATENT DOCUMENTS

| 3,644,793 | A | 2/1972 | Ilk |
|---|---|---|---|
| 4,015,169 | A | 3/1977 | Misencik |
| 4,065,096 | A | 12/1977 | Frantz et al. |
| 4,246,621 | A | 1/1981 | Tsukioka |
| 4,630,166 | A | 12/1986 | D'Onofrio |
| 5,815,365 | A | 9/1998 | Stege |
| 6,853,530 | B1 | 2/2005 | Radusewicz et al. |

(Continued)

FOREIGN PATENT DOCUMENTS

GB 1043199 A 9/1966

*Primary Examiner* — Danny Nguyen
(74) *Attorney, Agent, or Firm* — Pearne & Gordon LLP

(57) ABSTRACT

A solenoid coil discharging circuit includes a rectifier, transistor, and diode. The rectifier is coupled to an alternating current signal, and provides a rectified signal in response to being coupled to the alternating current signal. The transistor is coupled to the rectifier circuit, and biased in on in response to the alternating current signal being coupled to the rectifier, thereby enabling coupling of the rectified signal to a solenoid coil. The diode is coupled to the rectifier, and discharges current from the solenoid coil in response to the alternating current signal being de-coupled from the rectifier. A method of discharging a solenoid coil includes rectifying an alternating current signal to provide a rectified signal, biasing a transistor on in response to the alternating current signal being rectified, thereby enabling coupling of the rectified signal to the solenoid coil through the transistor, and discharging current from the solenoid coil through the diode in response to discontinuing rectification of the alternating current signal.

23 Claims, 5 Drawing Sheets

(56) References Cited

U.S. PATENT DOCUMENTS

| | | | |
|---|---|---|---|
| 7,540,721 B2 | 6/2009 | Liedtke et al. | |
| 8,023,243 B2 | 9/2011 | Adams et al. | |
| 2003/0063418 A1* | 4/2003 | Bergh | H01H 47/32 361/51 |
| 2008/0218928 A1* | 9/2008 | Baek | H01H 47/325 361/143 |
| 2009/0284878 A1* | 11/2009 | Critchley | H01H 47/32 361/43 |
| 2014/0225455 A1* | 8/2014 | Erwin | G05D 23/19 307/109 |

* cited by examiner

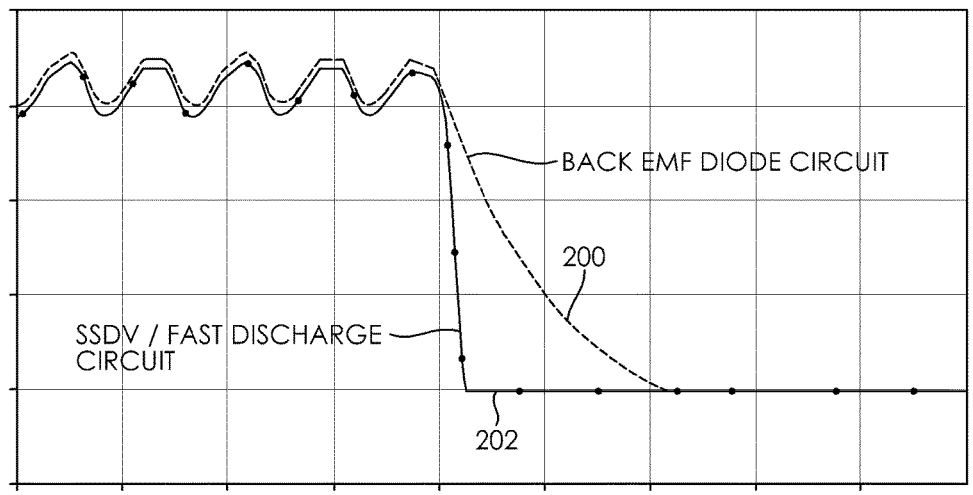
FIG. 3
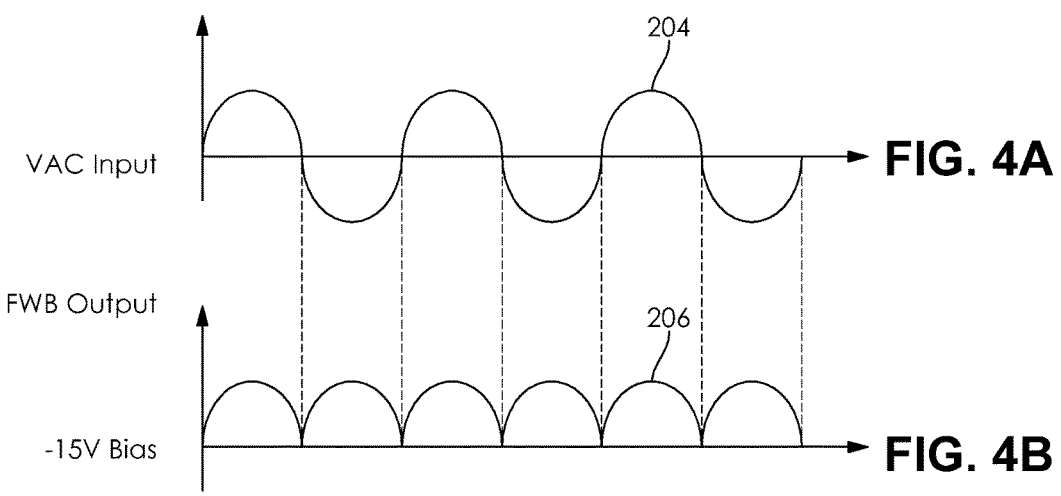
FIG. 4A
FIG. 4B

SOLENOID COIL DISCHARGING CIRCUIT

BACKGROUND

Field

The disclosed embodiments relate to DC solenoid coils, such as DC solenoid coils used in conjunction with solenoid operated valves (SOV). More particularly, the disclosed embodiments relate to a control device that fully actuates a DC solenoid coil using an alternating current (AC) signal.

Related Art

Upon removing power from a solenoid coil, a polarity of the solenoid coil reverses and current stored in the solenoid coil discharges to ground through a high impedance across the solenoid coil. Depending on the amount of charge stored in the solenoid coil and the value of this high impedance, a negative voltage is generated across the solenoid coil in the order of thousands of volts during a very short duration of time, such as microseconds, while the solenoid coil current is being discharged. Unfortunately, a high-voltage transient that results discharging the solenoid coil can be extremely destructive to an input power interface circuit connected to the solenoid coil.

SUMMARY

The embodiments disclosed herein include a solenoid coil discharging circuit, which includes a rectifier, transistor, and diode. The rectifier is selectively coupled to an alternating current signal, and provides a rectified signal in response to being operatively coupled to the alternating current signal. The transistor is operatively coupled to the rectifier circuit, and is biased in an on state in response to the alternating current signal being operatively coupled to the rectifier, thereby enabling operative coupling of the rectified signal to a solenoid coil. The diode is operatively coupled to the rectifier, and discharges current from the solenoid coil in response to the alternating current signal being operatively de-coupled from the rectifier.

The rectifier can include a full-wave bridge rectifier, the diode can include a transient voltage suppression diode, and the transistor can include a junction field effect transistor. The solenoid coil discharging circuit can include a gate control circuit operatively coupled to the rectifier. The gate control circuit can bias the transistor in the on state in response to the alternating current signal being operatively coupled to the rectifier. The gate control circuit can include at least one of a Zener diode, diode, capacitor, and/or resistor. The gate control circuit can be operatively coupled to a negative output terminal of the rectifier. The solenoid coil discharging circuit can include a bias control circuit operatively coupled to the rectifier, which biases the transistor in an off state in response to the alternating current signal being operatively de-coupled from the rectifier. The bias control circuit can include at least one of a Zener diode, and/or capacitor. The bias control circuit can be operatively coupled to a positive output terminal of the rectifier.

The embodiments disclosed herein further include a method of discharging a solenoid coil, which includes rectifying an alternating current signal to provide a rectified signal, biasing a transistor in an on state in response to the alternating current signal being rectified, thereby enabling operative coupling of the rectified signal to the solenoid coil through the transistor, and discharging current from the solenoid coil through the diode in response to discontinuing rectification of the alternating current signal.

Rectifying an alternating current signal to provide a rectified signal may include full-wave rectifying the alternating current signal to provide the rectified signal. The diode may include a transient voltage suppression diode, and the transistor may include a junction field effect transistor. Biasing the transistor in the on state may include biasing the transistor in the on state using a gate control circuit, which may include at least one of a Zener diode, diode, capacitor, and/or resistor. The method may also include operatively coupling the gate control circuit to a negative output terminal of a rectifier, and biasing the transistor in an off state using a bias control circuit in response to discontinuing rectification of the alternating current signal. The bias control circuit may include at least one of a Zener diode, and/or capacitor. The method may include operatively coupling the bias control circuit to a positive output terminal of a rectifier.

Other embodiments will become apparent from the following detailed description considered in conjunction with the accompanying drawings. It is to be understood, however, that the drawings are designed as an illustration only and not as a definition of the limits of any of the embodiments.

BRIEF DESCRIPTION OF THE DRAWINGS

The following drawings are provided by way of example only and without limitation, wherein like reference numerals (when used) indicate corresponding elements throughout the several views, and wherein:

FIG. 3 is a graphical comparison of current discharge waveforms between a conventional technique for discharging a solenoid coil and that provided by the SSPV solenoid coil fast discharge electronic assembly shown in FIGS. 1 and 2 for discharging the solenoid coil;

FIG. 4*a* shows an input voltage waveform of the SSPV solenoid coil fast discharge electronic assembly shown in FIGS. 1 and 2;

FIG. 4*b* shows an output voltage waveform of a full-wave bridge rectifier used in the SSPV solenoid coil fast discharge electronic assembly shown in FIGS. 1 and 2;

It is to be appreciated that elements in the figures are illustrated for simplicity and clarity. Common but well-understood elements that are useful or necessary in a commercially feasible embodiment are not shown in order to facilitate a less hindered view of the illustrated embodiments.

DETAILED DESCRIPTION

Figure 1:
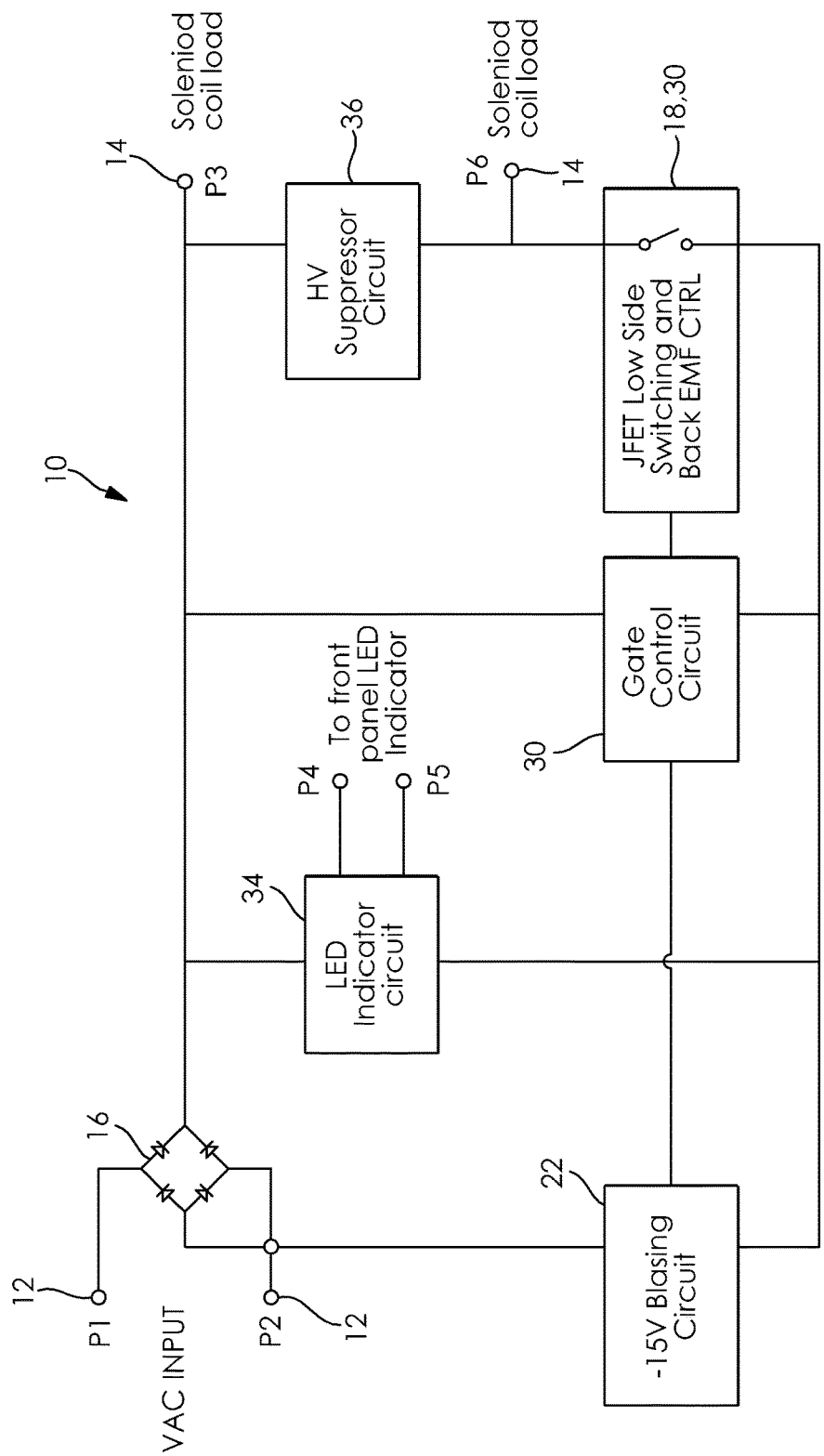
FIG. 1 is a block diagram of a scram solenoid pilot valve (SSPV) solenoid coil fast discharge electronic assembly that is configured to be associated with a solenoid coil actuated valve assembly.

FIG. 1 shows a block diagram of a scram solenoid pilot valve (SSPV) solenoid coil fast discharge electronic assembly 10 in accordance with one or more embodiments disclosed herein. The SSPV solenoid coil fast discharge electronic assembly 10 converts an alternating current voltage input, such as a 115 VAC (±10 VAC) input, provided at input terminals 12 to a full-wave rectified voltage at output terminals 14, to which a solenoid coil actuated valve assembly (not shown) can be connected.

The function of the SSPV solenoid coil fast discharge electronic assembly 10 is two-fold. The SSPV solenoid coil fast discharge electronic assembly 10 converts the alternating current voltage (VAC) input to a full-wave voltage direct current (VDC) output that energizes a direct current (DC) solenoid coil (not shown). The SSPV solenoid coil fast discharge electronic assembly 10 also discharges current from the solenoid coil in substantially less time than an inductive time constant of the coil. By utilizing the embodiments disclosed herein, the time required to discharge the solenoid coil current is reduced by approximately 20% from that required when using conventional techniques that discharge the solenoid coil current to ground. The amount of this reduction depends on the specifications of a transient voltage suppression (TVS) diode voltage selected for use in the SSPV solenoid coil fast discharge electronic assembly 10 and the inductance of the solenoid coil being discharged. De-energizing the solenoid coil actuated valve in such a shortened period of time corresponds to collapsing a magnetic field in the valve assembly in that same time, thereby closing the coil actuated valve in a much shorter period of time.

The SSPV solenoid coil fast discharge electronic assembly 10 converts the VAC input 12 to an unfiltered full-wave VDC output using a full-wave bridge rectifier 16 mounted, for example, on a printed circuit board. The full-wave bridge rectifier 16 includes four (4) diodes. When power is removed from the solenoid coil, a polarity across the output terminals 14 of the SSPV solenoid coil fast discharge electronic assembly 10, and thus the input terminals of the solenoid coil reverses and current stored in the solenoid coil discharges to ground through a high impedance across the solenoid coil. Depending on the current in the solenoid coil and the value of this high impedance, a negative voltage $V_{coil}$ can be generated across the solenoid coil in the order of thousands of volts over a very short duration of time, such as microseconds, during the discharge of the solenoid coil current in accordance with the following equation:

$$V_{coil} = L\frac{di}{dt}, \quad (1)$$

where L is an inductance of the solenoid coil in Henries, and di/dt is a change in current in the solenoid coil as a function of time. This high-voltage transient is referred to as "back electromotive force" (EMF).

This high-voltage transient can be very destructive to an input power interface circuit connected to the solenoid coil. To prevent damage to the input power interface circuit, this high-voltage transient may be limited or snubbed by connecting a so-called "flyback" or "snubber" diode in parallel across the terminals 14 of the solenoid coil, such that a cathode of the flyback diode is connected to a positive voltage terminal of the solenoid coil and an anode of the flyback diode is connected a negative voltage terminal of the solenoid coil. Upon de-energizing the solenoid coil, the polarity of the solenoid coil is reversed, and the flyback diode conducts current from the solenoid coil to ground through a low-impedance path. A discharge time τ of the solenoid coil is, therefore, approximately equal to the time constant of the solenoid coil, which is provided by the following equation:

$$\tau = \frac{L}{R}, \quad (2)$$

where R is a resistance of the solenoid coil wire in ohms, and L is an inductance of the solenoid coil in Henries.

When using a flyback diode-based circuit, the discharge time τ of the solenoid coil is directly related to the inductance of the solenoid coil and inversely related to the resistance of the solenoid coil. In general, a high-inductance solenoid coil requires less power to energize, but provides a substantially greater discharge time when de-energized. A high-impedance/low-power solenoid coil with a very fast discharge time requires that the solenoid coil discharge to some high-negative voltage, the value of which is proportional to how fast the solenoid coil is required to discharge, while providing isolation between the input power interface circuit and the negative voltage generated. The higher the voltage is, the quicker the discharge time becomes, up to a limit imposed by the solenoid coil inductance and DC resistance. The SSPV solenoid coil fast discharge electronic assembly 10 provides a substantially faster discharge rate, and thus a shorter discharge time for the DC solenoid coil when de-energized than the conventional flyback diode-based technique described above.

Figure 2:
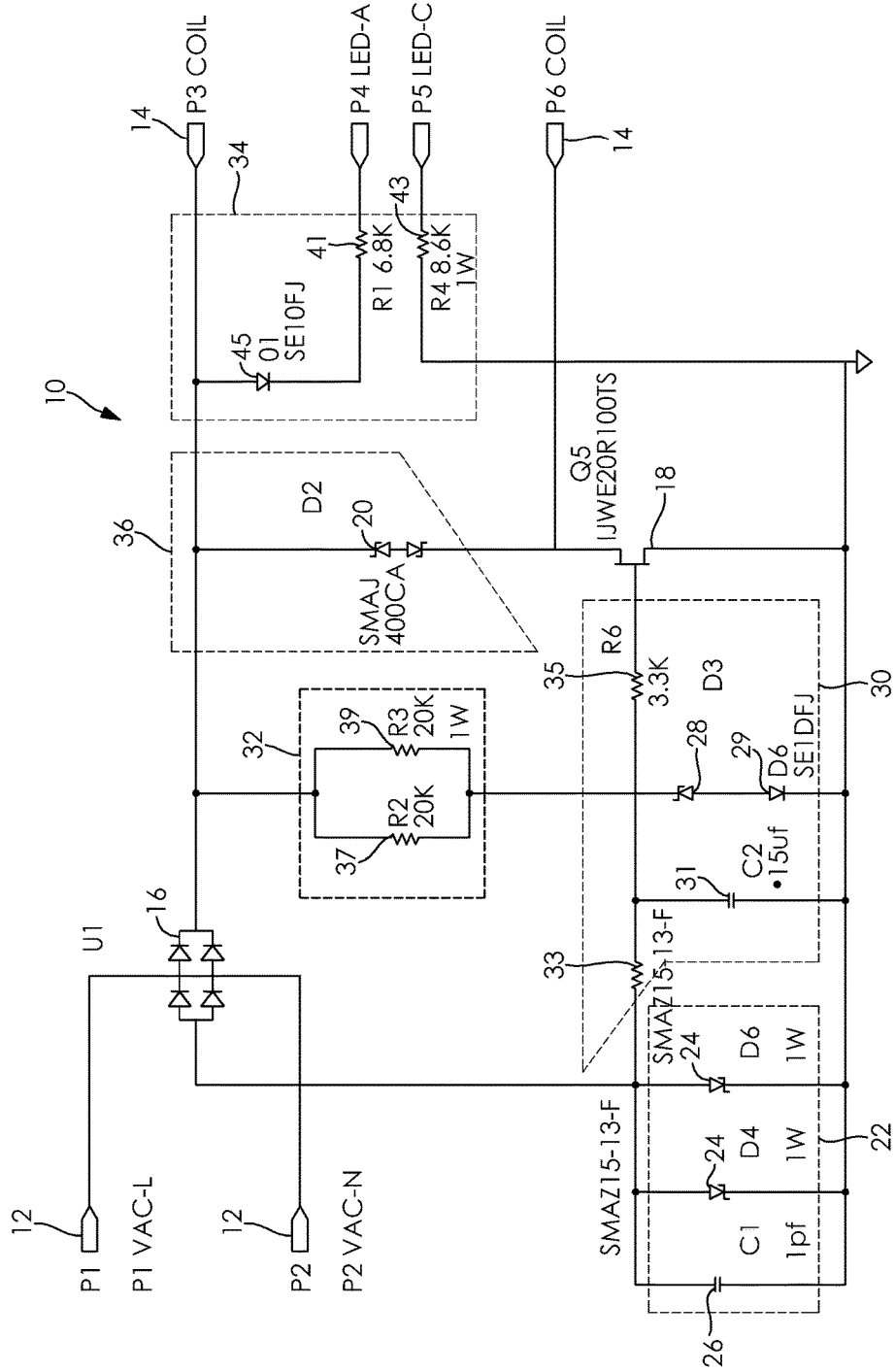
FIG. 2 is a schematic diagram of an embodiment of the SSPV solenoid coil fast discharge electronic assembly shown in FIG. 1.

The SSPV solenoid coil fast discharge electronic assembly 10 includes a normally-on n-channel junction field effect transistor (JFET) 18 shown in FIG. 2. The JFET 18 can be implemented using a 1200V silicon carbide JFET, part number IJW120R100T1, which is commercially available from Infineon Technologies AG, Munich, Germany 81726. The JFET 18 provides immunity to high doses of radiation exposure or total irradiated dosage (TID). The SSPV solenoid coil fast discharge electronic assembly 10 can be used in high radiation environments, such as a nuclear power plant (NNP) over an operating lifetime of thirty (30) years.

As shown in FIGS. 1 and 2, the SSPV solenoid coil fast discharge electronic assembly 10 uses a transient voltage suppression (TVS) diode 20 in conjunction with a low-side switching circuit 22 based on the normally on n-channel JFET 18 to force the solenoid coil to discharge to approximately −400V. The TVS diode 20 is implemented using a transient voltage suppression diode, part number SMAJ400CA, which is commercially available from Littelfuse Inc., 8755 West Higgins Road, Suite 500, Chicago, Ill. 60631. The TVS diode 20 is a clamping device that suppresses voltages (overvoltage) greater than a breakdown voltage associated with the TVS diode 20. The TVS diode 20 automatically resets when the overvoltage is removed. The TVS diode 20 absorbs the transient energy internally when forward biased by a voltage exceeding a threshold voltage of the TVS diode 20, which in this case, is provided by the de-energized solenoid coil. The TVS diode 20 is included in the high-voltage (HV) suppressor circuit 36 shown in FIGS. 1 and 2. The diode D1 is used to provide power to an external LED indicator light and is electrically connected in series between the resistor R1 and the full-wave bridge rectifier 16, and the TVS diode 20 is electrically connected in parallel across the output terminals 14 of the SSPV solenoid coil fast discharge electronic assembly 10 and the input terminals of the solenoid coil.

When the VAC input to the SSPV fast solenoid coil fast discharge electronic assembly 10 is removed, the normally-on JFET 18 is biased to an off state, which isolates the solenoid coil from circuit ground. This forces the back EMF voltage developed across the solenoid coil to discharge through the TVS diode 20 connected across the terminals 14 of the solenoid coil to approximately −400V. This negative voltage is well within an acceptable rating of the n-channel JFET 18, a drain-source voltage Vdss of which is greater than 1200V. Vdss represents a maximum drain-source voltage that the JFET 18 can withstand without causing avalanche breakdown in the JFET 18. Vdss is essentially an isolation rating of the JFET 18 between its drain and source terminals if the JFET 18 is connected in a common source configuration.

As shown in FIGS. 1 and 2, the JFET 18 uses a −15V biasing circuit 22 to provide reverse biasing of a gate-to-source junction of the JFET 18 and turn the JFET 18 off when the VAC input is removed. Reverse biasing the JFET 18 is provided by applying a negative voltage across the gate-to-source junction of the JFET 18. This negative voltage is derived from the full-wave bridge rectifier (FWB) 16 by connecting the negative terminal of the FWB 16 to 15V Zener diodes 24, which are connected to circuit ground. A typical connection for a full-wave bridge rectifier 16 couples a negative power terminal to ground. Utilizing the FWB 16 and −15V biasing circuit 22 enables the SSPV fast solenoid coil fast discharge electronic assembly 10 to generate a regulated negative voltage used to turn the JFET 18 gate-to-source junction off, which allows the solenoid coil to discharge through the TVS diode 20 rather than ground. A voltage hold capacitor 26 connected in parallel with Zener diodes 24 maintains the −15V level long enough after the VAC input has been removed to turn the JFET 18 off and discharge the solenoid coil through the TVS diode 20.

The −15V biasing circuit 22 includes the voltage hold capacitor 26 connected in parallel with two (2) Zener diodes 24 D4, D5. The Zener diodes 24 can be implemented using a 1.0 W surface mount Zener diode, part number SMAZ15-13-F, which is commercially available from Diodes Incorporated, 4949 Hedgcoxe Road, Suite 200, Plano, Tex. 75024.

A gate control circuit 30 coupled to the gate-to-source junction of the JFET 18 also forward biases the JFET 18 during normal operation by providing a positive voltage from the gate terminal to the source terminal. A positive bias is provided by a low-voltage (3.3V) Zener diode 28 in the gate control circuit 30, which is powered from the positive voltage output of the FWB 16. The Zener diode 28 can be implemented using a surface mount silicon Zener diode, part number MMSZ5226BT1, which is commercially available from ON Semiconductor, 5005 East McDowell Road, Phoenix, Ariz. 85008. The gate control circuit 30 includes diode 28 D3, diode D6, capacitor C2, and resistors R5, R6. Diode 28 D3 and diode 29 D6 are connected in series together, and the series connection of diode 28 D3 and diode 29 D6 is connected in parallel with capacitor 31 C2. Resistor 33 R5 is connected in series between the parallel combination of capacitor 31 C2 and diodes 28 D3, D6, and the −15V biasing circuit 22. Resistor 35 R6 is connected in series between the parallel combination of capacitor 31 C2, diode 28 D3 and diode 29 D6, and a gate terminal of the JFET 18.

Both the −15V and +3.3V Zener voltages are summed in a filtered resistive summing network 32 shown in FIG. 2, which provides a positive gate-to-source voltage to the JFET during normal-on operation and a negative gate-to-source voltage when the VAC input is removed. The filtered resistive summing network 32 includes resistors 37 R2, 39 R3 electrically connected in parallel between the full-wave bridge rectifier 16 and the diode 28 D3.

A graphical comparison of techniques for discharging the solenoid coil based on the back EMF or flyback diode and the SSPV solenoid coil fast discharge electronic assembly in milliamps as a function of time in milliseconds is shown in FIG. 3 for a solenoid coil having an inductance of 15 Henries and a resistance of 1.28K ohms. A plot 200 shows the solenoid coil current discharge rate for the flyback diode technique, and a plot 202 shows the solenoid coil current discharge rate for the SSPV solenoid coil fast discharge electronic assembly. Clearly, the discharge rate shown by plot 202 is substantially greater than that shown by plot 200.

FIG. 4a shows a voltage waveform 204 of the VAC input, and FIG. 4b shows a voltage waveform 206 of an output of the FWB 16 including the −15V bias provided by the −15V biasing circuit 22 shown in FIGS. 1 and 2.

As shown in FIGS. 1 and 2, the −15V bias voltage is provided by connecting a negative terminal of the FWB 16 to the −15V biasing circuit 22. A 1 microfarad capacitor C1 26 is connected across the Zener diodes 24 to maintain the −15V voltage level after the VAC input has been removed for a period of time that is sufficient to turn the JFET 16 off and force the solenoid coil to discharge the back EMF across the TVS diode 20. This −15V bias voltage level is resistively summed into a gate terminal of the JFET 18 using resistor R5 33 of the gate control circuit 30, as shown in FIG. 2

A positive gate voltage to the JFET 18 is provided by the gate control circuit 30, which provides a +3.3 voltage level from a positive output of the FWB 16 through filtered resistive summing network 32 including resistor network R2 and R3, as shown in FIG. 2. a 0.15 microfarad capacitor C2 31 maintains a sufficiently positive voltage to the gate terminal of the JFET 18 while the VAC input is present to maintain the JFET 18 on and the solenoid coil energized. A ratio of the value of resistor R5 33 to resistors R2, R3 37, 39 and the capacitor C2 31 ensures that the gate voltage of the JFET 18 remains sufficiently positive to keep the JFET 18 on and the coil energized with the VAC input applied.

To close the valve assembly, the VAC input is removed from the SSPV solenoid coil fast discharge electronic assembly 10. Loss of the VAC input disables the positive gate control circuit 30 and allows the −15V bias voltage to be applied to the gate terminal of the JFET 18, thereby turning the JFET 18 off and quickly discharging the solenoid coil through the TVS diode 20. Resistor R6 35 is used to ensure that real resistive impedance is presented to the gate terminal of the JFET 18 to provide stability during operation.

When the VAC input is applied to the SSPV fast solenoid coil fast discharge electronic assembly 10, a full-wave rectified voltage is applied to one terminal of the solenoid coil and the other terminal of the solenoid coil is connected to circuit ground via the JFET 18, which is biased on. The energized coil current provides a magnetic circuit used to maintain the SSPV valve assembly in the valve open position.

Figure 5:
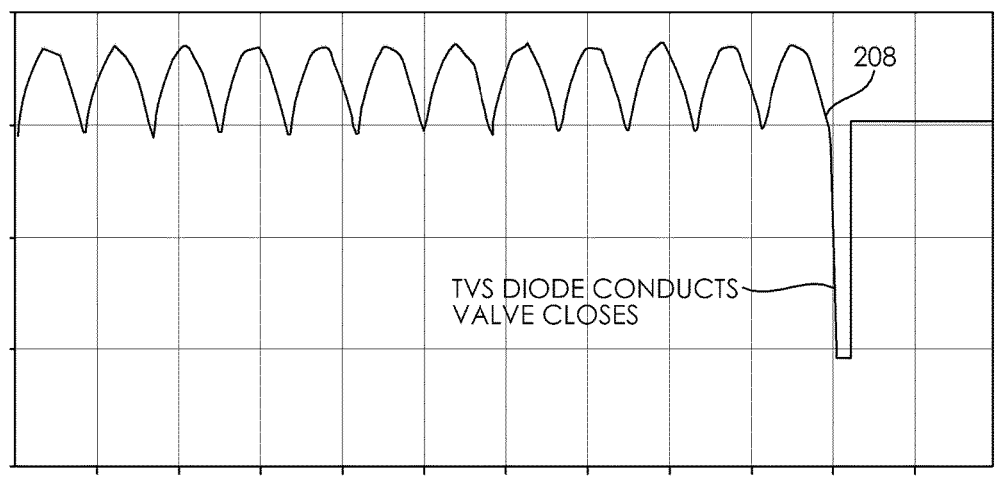
FIG. 5 shows a voltage waveform of the solenoid coil as a function of time for the SSPV solenoid coil fast discharge electronic assembly shown in FIGS. 1 and 2.

To quickly close the SSPV fast solenoid coil fast discharge electronic assembly 10, the VAC input is removed from the SSPV fast solenoid coil fast discharge electronic assembly 10, which causes the gate control circuitry 30 to turn the JFET 18 off, which forces the solenoid coil to quickly discharge through the TVS diode 20, as shown at position 208 in FIG. 5. That portion of the solenoid coil voltage waveform shown in FIG. 5 that occurs before position 208 represents a period of time during which the VAC input is applied to the SSPV fast solenoid coil fast discharge electronic assembly, whereas that portion of the solenoid coil voltage waveform shown in FIG. 5 that occurs after position 208 represents a period of time during which the VAC input has been removed from the SSPV fast solenoid coil fast discharge electronic assembly. The sudden discharge of solenoid coil current also quickly closes the solenoid valve.

The SSPV fast solenoid coil fast discharge electronic assembly incorporates the following features:
(1) use of a full-wave rectified voltage to drive a DC solenoid coil;
(2) use of a negative terminal of the full-wave rectified bridge to create a negative bias voltage using a Zener diode connected from a negative terminal of the full-wave rectified bridge to ground;
(3) use of a TVS diode and JFET-based low-side switching typology to quickly discharge a solenoid coil in substantially less time than conventionally required to discharge the solenoid coil using a flyback diode-based typology; and
(4) use of discrete components, including an n-channel JFET to ensure circuit operation in a high radiation environment, such as a nuclear power plant for an extended operating time of up to thirty (30) years or more.

When the VAC input is applied to the SSPV fast solenoid coil fast discharge electronic assembly 10, a full-wave rectified voltage is applied to one terminal of the solenoid coil and the other terminal of the solenoid coil is connected to circuit ground via the JFET 18 being biased in an on state. The energized solenoid coil current provides a magnetic circuit used to maintain the SSPV valve assembly in the valve open position. The SSPV fast solenoid coil fast discharge electronic assembly 10 also powers a light emitting diode (LED) indicator interface circuit 34 shown in FIGS. 1 and 2, which is mounted on an external surface of the valve assembly to indicate that power is applied to the assembly when illuminated. The LED indicator interface circuit 34 includes resistors R1, R4 41, 43 and diode D1 45. Resistor R1 44 is electrically connected in series between the diode D1 45 and an LED (not shown), and resistor R4 43 is electrically connected in series between ground and an LED (not shown). In one embodiment, resistors R1, R4 41, 43 are replaced with a single resistor having a value approximately equal to a sum of the resistance values of resistors R1, R4 41, 43 and a wattage that is twice that of resistors R1, R4, 41, 43, such as a single 13.6K ohm, 2 W resistor.

Figure 6:
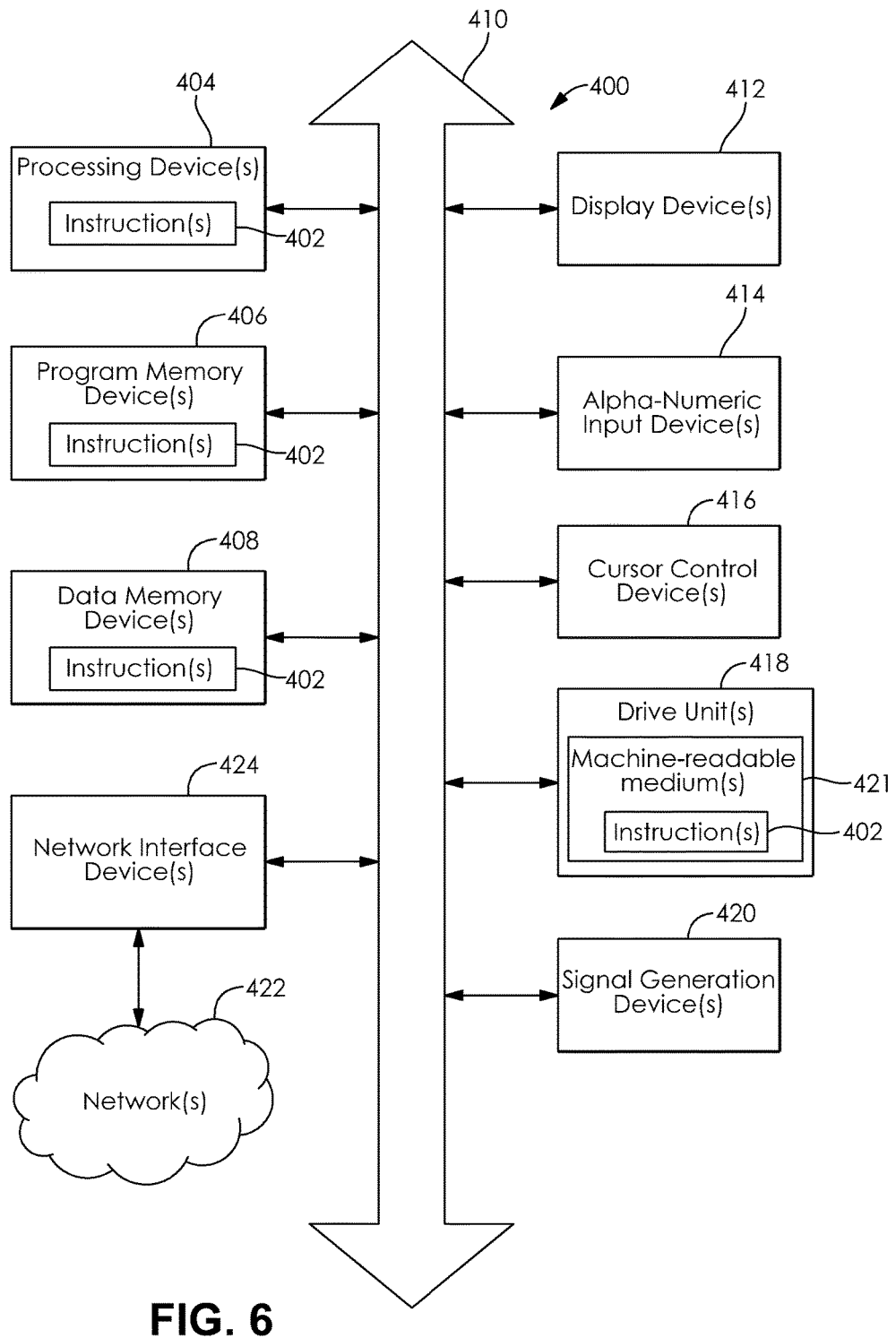
FIG. 6 is a block diagram of at least a portion of an exemplary machine in the form of a computing system that performs methods according to one or more embodiments disclosed herein.

One or more embodiments disclosed herein, or a portion thereof, may make use of software running on a computer or workstation. By way of example, only and without limitation, FIG. 6 is a block diagram of an embodiment of a machine in the form of a computing system 400, within which is a set of instructions 402 that, when executed, cause the machine to perform any one or more of the methodologies according to embodiments of the invention. In one or more embodiments, the machine operates as a standalone device; in one or more other embodiments, the machine is connected (e.g., via a network 422) to other machines. In a networked implementation, the machine operates in the capacity of a server or a client user machine in a server-client user network environment. Exemplary implementations of the machine as contemplated by embodiments of the invention include, but are not limited to, a server computer, client user computer, personal computer (PC), tablet PC, personal digital assistant (PDA), cellular telephone, mobile device, palmtop computer, laptop computer, desktop computer, communication device, personal trusted device, web appliance, network router, switch or bridge, or any machine capable of executing a set of instructions (sequential or otherwise) that specify actions to be taken by that machine.

The computing system 400 includes a processing device(s) 404 (e.g., a central processing unit (CPU), a graphics processing unit (GPU), or both), program memory device(s) 406, and data memory device(s) 408, which communicate with each other via a bus 410. The computing system 400 further includes display device(s) 412 (such as a liquid crystal display (LCD), flat panel, solid state display, or cathode ray tube (CRT)). The computing system 400 includes input device(s) 414 (e.g., a keyboard), cursor control device(s) 416 (e.g., a mouse), disk drive unit(s) 418, signal generation device(s) 420 (e.g., a speaker or remote control), and network interface device(s) 424, operatively coupled together, and/or with other functional blocks, via bus 410.

The disk drive unit(s) 418 includes machine-readable medium(s) 426, on which is stored one or more sets of instructions 402 (e.g., software) embodying any one or more of the methodologies or functions herein, including those methods illustrated herein. The instructions 402 may also reside, completely or at least partially, within the program memory device(s) 406, the data memory device(s) 408, and/or the processing device(s) 404 during execution thereof by the computing system 400. The program memory device(s) 406 and the processing device(s) 404 also constitute machine-readable media. Dedicated hardware implementations, such as but not limited to ASICs, programmable logic arrays, and other hardware devices can likewise be constructed to implement methods described herein. Applications that include the apparatus and systems of various embodiments broadly comprise a variety of electronic and computer systems. Some embodiments implement functions in two or more specific interconnected hardware modules or devices with related control and data signals communicated between and through the modules, or as portions of an ASIC. Thus, the example system is applicable to software, firmware, and/or hardware implementations.

The term "processing device" as used herein is intended to include any processor, such as, for example, one that includes a CPU (central processing unit) and/or other forms of processing circuitry. Further, the term "processing device" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the display device(s) 412, input device(s) 414, cursor control device(s) 416, signal generation device(s) 420, etc., can be collectively referred to as an "input/output interface," and is intended to include one or more mechanisms for inputting data to the processing device(s) 404, and one or more mechanisms for providing results associated with the processing device(s). Input/output or I/O devices (including but not limited to keyboards (e.g., alpha-numeric input device(s) 414, display device(s) 412, and the like) can be coupled to the system either directly (such as via bus 410) or through intervening input/output controllers (omitted for clarity).

In an integrated circuit implementation of one or more embodiments of the invention, multiple identical die are typically fabricated in a repeated pattern on a surface of a semiconductor wafer. Each such die may include a device described herein, and may include other structures and/or circuits. The individual dies are cut or diced from the wafer, then packaged as integrated circuits. One skilled in the art would know how to dice wafers and package die to produce integrated circuits. Any of the exemplary circuits or method illustrated in the accompanying figures, or portions thereof, may be part of an integrated circuit. Integrated circuits so manufactured are considered part of this invention.

An integrated circuit in accordance with the embodiments of the present invention can be employed in essentially any application and/or electronic system in which buffers are utilized. Suitable systems for implementing one or more embodiments of the invention include, but are not limited, to personal computers, interface devices (e.g., interface networks, high-speed memory interfaces (e.g., DDR3, DDR4), etc.), data storage systems (e.g., RAID system), data servers, etc. Systems incorporating such integrated circuits are considered part of embodiments of the invention. Given the teachings provided herein, one of ordinary skill in the art will be able to contemplate other implementations and applications.

In accordance with various embodiments, the methods, functions or logic described herein is implemented as one or more software programs running on a computer processor. Dedicated hardware implementations including, but not limited to, application specific integrated circuits, programmable logic arrays and other hardware devices can likewise be constructed to implement the methods described herein. Further, alternative software implementations including, but not limited to, distributed processing or component/object distributed processing, parallel processing, or virtual machine processing can also be constructed to implement the methods, functions or logic described herein.

The embodiment contemplates a machine-readable medium or computer-readable medium containing instructions 402, or that which receives and executes instructions 402 from a propagated signal so that a device connected to a network environment 422 can send or receive voice, video or data, and to communicate over the network 422 using the instructions 402. The instructions 402 are further transmitted or received over the network 422 via the network interface device(s) 424. The machine-readable medium also contains a data structure for storing data useful in providing a functional relationship between the data and a machine or computer in an illustrative embodiment of the systems and methods herein.

While the machine-readable medium 402 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the embodiment. The term "machine-readable medium" shall accordingly be taken to include, but not be limited to: solid-state memory (e.g., solid-state drive (SSD), flash memory, etc.); read-only memory (ROM), or other non-volatile memory; random access memory (RAM), or other re-writable (volatile) memory; magneto-optical or optical medium, such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

It should also be noted that software, which implements the methods, functions and/or logic herein, are optionally stored on a tangible storage medium, such as: a magnetic medium, such as a disk or tape; a magneto-optical or optical medium, such as a disk; or a solid state medium, such as a memory automobile or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein and other equivalents and successor media, in which the software implementations herein are stored.

Although the specification describes components and functions implemented in the embodiments with reference to particular standards and protocols, the embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments are utilized and derived therefrom, such that structural and logical substitutions and changes are made without departing from the scope of this disclosure. Figures are also merely representational and are not drawn to scale. Certain proportions thereof are exaggerated, while others are decreased. Accordingly, the specification and drawings are to be regarded in an illustrative rather than a restrictive sense.

Such embodiments are referred to herein, individually and/or collectively, by the term "embodiment" merely for convenience and without intending to voluntarily limit the scope of this application to any single embodiment or inventive concept if more than one is in fact shown. Thus, although specific embodiments have been illustrated and described herein, it should be appreciated that any arrangement calculated to achieve the same purpose are substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single embodiment. Thus the following claims are hereby incorporated into the detailed description, with each claim standing on its own as a separate example embodiment.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single embodiment. Thus the following claims are hereby incorporated into the Detailed Description, with each claim standing on its own as separately claimed subject matter.

Although specific example embodiments have been described, it will be evident that various modifications and changes are made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and without limitation, specific embodiments in which the subject matter are practiced. The embodiments illustrated are described in sufficient detail to enable those skilled in the art to practice the teachings herein. Other embodiments are utilized and derived therefrom, such that structural and logical substitutions and changes are made without departing from the scope of this disclosure. This Detailed Description, therefore, is not to be taken in a limiting sense, and the scope of various embodiments is defined only by the appended claims, along with the full range of equivalents to which such claims are entitled.

Given the teachings provided herein, one of ordinary skill in the art will be able to contemplate other implementations and applications of the techniques of the disclosed embodiments. Although illustrative embodiments have been described herein with reference to the accompanying drawings, it is to be understood that these embodiments are not limited to the disclosed embodiments, and that various other changes and modifications are made therein by one skilled in the art without departing from the scope of the appended claims.

What is claimed is:

1. A solenoid coil discharging circuit, which comprises:
   a rectifier, the rectifier being selectively coupled to an alternating current signal, the rectifier providing a rectified signal in response to being operatively coupled to the alternating current signal;
   a transistor, the transistor being operatively coupled to the rectifier circuit, the transistor being biased in an on state in response to the alternating current signal being operatively coupled to the rectifier, thereby enabling operative coupling of the rectified signal to a solenoid coil;
   a diode operatively coupled to the rectifier, the diode discharging current from the solenoid coil in response to the alternating current signal being operatively de-coupled from the rectifier; and
   a bias control circuit, the bias control circuit comprising a Zener diode and a capacitor to create a negative bias to control the transistor operation, and the bias control circuit being operatively coupled to the rectifier, the bias control circuit biasing the transistor in an off state in response to the alternating current signal being operatively de-coupled from the rectifier.

2. The solenoid coil discharging circuit, as defined by claim 1, wherein the rectifier comprises a full-wave bridge rectifier.

3. The solenoid coil discharging circuit, as defined by claim 1, wherein the diode comprises a transient voltage suppression diode.

4. The solenoid coil discharging circuit, as defined by claim 1, wherein the transistor comprises a junction field effect transistor.

5. The solenoid coil discharging circuit, as defined by claim 1, further comprising a gate control circuit, the gate control circuit being operatively coupled to the rectifier, the gate control circuit biasing the transistor in the on state in response to the alternating current signal being operatively coupled to the rectifier.

6. The solenoid coil discharging circuit, as defined by claim 5, wherein the gate control circuit further comprises a resistor, a capacitor, and at least one of a Zener diode, and a diode.

7. The solenoid coil discharging circuit, as defined by claim 5, wherein the gate control circuit is operatively coupled to a negative output terminal of the rectifier.

8. The solenoid coil discharging circuit, as defined by claim 1, wherein the bias control circuit is operatively coupled to a positive output terminal of the rectifier.

9. A method of discharging a solenoid coil, the method comprising:
   rectifying an alternating current signal to provide a rectified signal;
   biasing a transistor in an on state in response to the alternating current signal being rectified, thereby enabling operative coupling of the rectified signal to the solenoid coil through the transistor, wherein biasing the transistor in the on state comprises creating a negative bias to turn on the transistor; and
   discharging current from the solenoid coil through the diode in response to discontinuing rectification of the alternating current signal.

10. The method of discharging a solenoid coil, as defined by claim 9, wherein rectifying an alternating current signal to provide a rectified signal further comprises full-wave rectifying the alternating current signal to provide the rectified signal.

11. The method of discharging a solenoid coil, as defined by claim 9, wherein the diode further comprises a transient voltage suppression diode.

12. The method of discharging a solenoid coil, as defined by claim 9, wherein the transistor further comprises a junction field effect transistor.

13. The method of discharging a solenoid coil, as defined by claim 9, wherein biasing the transistor in the on state further comprises biasing the transistor in the on state using a gate control circuit.

14. The method of discharging a solenoid coil, as defined by claim 13, wherein the gate control circuit further comprises a capacitor, a resistor, and at least one of a Zener diode and a diode.

15. The method of discharging a solenoid coil, as defined by claim 13, further comprising operatively coupling the gate control circuit to a negative output terminal of a rectifier, the rectifier rectifying the alternating current signal to provide the rectified signal.

16. The method of discharging a solenoid coil, as defined by claim 9, further comprising biasing the transistor in an off state using a bias control circuit in response to discontinuing rectification of the alternating current signal.

17. The method of discharging a solenoid coil, as defined by claim 16, wherein the bias control circuit further comprises a Zener diode, and a capacitor.

18. The method of discharging a solenoid coil, as defined by claim 16, further comprising operatively coupling the bias control circuit to a positive output terminal of a rectifier, the rectifier rectifying the alternating current signal to provide the rectified signal.

19. The solenoid coil discharging circuit, as defined by claim 6, wherein the gate control circuit creates a −15 V voltage for biasing the transistor.

20. A solenoid coil discharging circuit, which comprises:
a rectifier, the rectifier being selectively coupled to an alternating current signal, the rectifier providing a rectified signal in response to being operatively coupled to the alternating current signal;
a radiation resistant JFET (Junction Field Effect Transistor), the radiation resistant JFET being operatively coupled to the rectifier circuit, the radiation resistant JFET being biased in an on state in response to the alternating current signal being operatively coupled to the rectifier, thereby enabling operative coupling of the rectified signal to a solenoid coil; and
a Transient Suppressor Diode operatively coupled to the rectifier, the TVS diode discharging current from the solenoid coil in response to the alternating current signal being operatively de-coupled from the rectifier.

21. The solenoid coil discharging circuit of claim 20, further comprising a bias control circuit, wherein the bias control circuit comprises a Zener diode and a capacitor, and wherein the bias control circuit is operatively coupled to the rectifier, the bias control circuit operative to create a −15 V voltage for biasing the radiation resistant JFET in an off state in response to the alternating current signal being operatively de-coupled from the rectifier.

22. The solenoid coil discharging circuit of claim 20, further comprising a gate control circuit, wherein the gate control circuit comprises a resistor, a capacitor, and at least one of a Zener diode and a diode, and wherein the gate control circuit is operatively coupled to the rectifier, the gate control circuit operative to create a −15 V voltage for biasing the radiation resistant JFET in the on state in response to the alternating current signal being operatively coupled to the rectifier.

23. The solenoid coil discharging circuit of claim 20, wherein a turn-on bias to bias the radiation resistant JFET in the on state is a negative bias.

* * * * *